United States Patent
Clouse et al.

(10) Patent No.: US 11,900,436 B1
(45) Date of Patent: Feb. 13, 2024

(54) NATURAL LANGUAGE PROCESSING BASED PRODUCT SUBSTITUTION SYSTEM AND RELATED METHODS

(71) Applicant: Inmar Clearing, Inc., Winston-Salem, NC (US)

(72) Inventors: Jeffery Clouse, Jamestown, NC (US); Kathryn Rouse, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/967,799

(22) Filed: Oct. 17, 2022

(51) Int. Cl.
G06Q 30/02 (2023.01)
G06Q 30/0601 (2023.01)
(Continued)

(52) U.S. Cl.
CPC ......... *G06Q 30/0631* (2013.01); *G06F 40/20* (2020.01); *G06Q 30/0277* (2013.01)

(58) Field of Classification Search
CPC ........... G06Q 30/0631; G06Q 30/0277; G06Q 30/0254; G06Q 10/067; G06Q 30/0246; G06Q 30/02; G06Q 30/0207; G06F 40/20
See application file for complete search history.

(56) References Cited

U.S. PATENT DOCUMENTS 7,236,942 B1 * 6/2007 Walker ............... G06Q 30/0235
705/16
9,760,802 B2 9/2017 Chen et al.
(Continued)

FOREIGN PATENT DOCUMENTS

CA 3156623 A1 * 5/2021 ............... G06F 3/08
KR 10-1746328 B1 * 6/2017 ............. G06F 11/36
(Continued)

OTHER PUBLICATIONS

Nan Li; Longin Jan Latcki, Enhanced Affinity Interference Based Recommender Systems (English), 2016 IEEE/WIC/ACM International Conference on Web Intelligence (WI) (pp. 597-601), Oct. 1, 2016 (Year: 2016).*
(Continued)

*Primary Examiner* — Marilyn G Macasiano
(74) *Attorney, Agent, or Firm* — ALLEN, DYER, DOPPELT, + GILCHRIST, P.A.

(57) ABSTRACT

A product substitution system may include a shopper device associated with a given shopper, and a product substitution server. The server may obtain descriptive purchased product data for purchased products from a retailer, and iteratively operate a natural language processing (NLP) algorithm to accept, as input thereto, the descriptive purchased product data, and generate, as output therefrom, a multi-dimensional representation of a relationship among the purchased products. The server may also, for each iteration, determine a product-to-product affinity based upon the multi-dimensional representation of the relationship, and determine a recommended substitute product for one of the products based upon the determined product-to-product affinity, and communicate the recommended substitute product to the shopper device. The server may also, for each iteration, obtain updated descriptive purchased product data for an updated plurality of purchased products from the retailer.

14 Claims, 8 Drawing Sheets

(51) Int. Cl.
  *G06F 40/20* (2020.01)
  *G06Q 30/0241* (2023.01)

(56) References Cited

U.S. PATENT DOCUMENTS

| | | | |
|---|---|---|---|
| 9,984,402 B2 | 5/2018 | Cao | |
| 2014/0089133 A1* | 3/2014 | Argue | G06Q 30/0282 705/26.7 |
| 2015/0088606 A1* | 3/2015 | Tyagi | G06Q 30/0202 705/7.31 |
| 2015/0213376 A1* | 7/2015 | Ideses | G06N 20/00 706/12 |
| 2016/0253679 A1* | 9/2016 | Venkatraman | G06Q 30/0185 705/310 |
| 2019/0236679 A1* | 8/2019 | Kumar | G06Q 30/0631 |
| 2021/0090748 A1* | 3/2021 | Toyoshiba | G16H 10/60 |
| 2021/0110458 A1* | 4/2021 | Pande | G06Q 30/0623 |
| 2021/0271702 A1* | 9/2021 | Irie | G06V 20/46 |
| 2022/0092670 A1* | 3/2022 | Laserson | G06Q 30/06 |
| 2022/0138561 A1* | 5/2022 | Prendki | G06N 3/08 706/12 |

FOREIGN PATENT DOCUMENTS

| | | | | |
|---|---|---|---|---|
| WO | WO 2013/010024 A1 * | 1/2013 | | G06F 17/30 |
| WO | WO 2014/009400 A1 * | 1/2014 | | H04W 64/00 |
| WO | WO 2015/143393 A1 * | 9/2015 | | G06F 17/30 |
| WO | WO 2021/029977 A1 * | 2/2021 | | G06Q 30/06 |

OTHER PUBLICATIONS

Nan Li; Longin Jan Latecki, Affinity Inference with Application to Recommender Systems (English), 2015 IEEE/WIC/ACM International Conference on Web Intelloigence and Intelligent Agent Technology (WI-IAT) (vol. 1, pp. 393-400), Dec. 1, 2015 (Year: 2015).*

Liu, Guannan; Zhang, Liang; Wu, Junjie; Fang, Ziao, Recommendtion with Attribute-aware Product Networks: A Representation Learning Model (English), Aug. 16, 2019 (Year: 2019).*

Tien-Lung Chang; Tyng-Luh Liu; Jen-Hui Chuang, Improving local learning for object categorization by exploring the effects of ranking (English), 2008 IEEE Conference on Computer Vision and pattern Recognition (pp. 1-8), Sep. 5, 2008 (Year: 2008).*

Xiao Yu; Kwabena Ebo Bennin; Jin Liu; Jacky Wai Keung; xiaofei Yin; Zhou Xu, An Empirical Study of Learning to Rank Techniques for Effort-Aware Defect Prediction (English), 2019 IEEE 26th International Coference on Software Analysis, Evolution and Reengineering (SANER) (pp. 298-309), Feb. 1, 2019 (Year: 2019).*

Cristiano Inacio Lemes; Diego Furtado Silva; Gustavo E.A.P.A Batista, Adding Diversity to Rank Examples in Anytime Nearest Neighbor Classification (English), 2014 13th International Conference on Machine learning and Applications (pp. 129-134), Dec. 1, 2014 (Year: 2014).*

Barkan, Oren, and Noam Koenigstein. "Item2vec: neural item embedding for collaborative filtering." 2016 IEEE 26th International Workshop on Machine Learning for Signal Processing (MLSP). IEEE, 2016.

Caselles-Dupré, Hugo, Florian Lesaint, and Jimena Royo-Letelier. "Word2vec applied to recommendation: Hyperparameters matter." Proceedings of the 12th ACM Conference on Recommender Systems. ACM, 2018.

Gabel, Sebastian, Daniel Guhl, and Daniel Klapper. "P2V-MAP: Mapping Market Structures for Large Retail Assortments." Journal of Marketing Research (2019): 0022243719833631.

Maaten, Laurens van der, and Geoffrey Hinton. "Visualizing data using t-SNE." Journal of machine learning research Nov. 9, 2008: 2579-2605.

Mikolov, Tomas, et al. "Distributed representations of words and phrases and their compositionality." Advances in neural information processing systems. 2013.

Omohundro, Stephen M. Five balltree construction algorithms. Berkeley: International Computer Science Institute, 1989.

Rehurek, Radim, and Petr Sojka. "Software framework for topic modelling with large corpora." In Proceedings of the LREC 2010 Workshop on New Challenges for NLP Frameworks. 2010.

Pedregosa, Fabian, et al. "Scikit-learn: Machine learning in Python." the Journal of machine Learning research 12(2011): 2825-2830.

Kusner, Matt, et al. "From word embeddings to document distances." International conference on machine learning. 2015.

Lau, Jey Han, and Timothy Baldwin. "An Empirical Evaluation of doc2vec with Practical Insights into Document Embedding Generation." Proceedings of the 1st Workshop on Representation Learning for NLP. 2016.

Le, Quoc, and Tomas Mikolov. "Distributed representations of sentences and documents." International conference on machine learning, 2014.

* cited by examiner

NATURAL LANGUAGE PROCESSING BASED PRODUCT SUBSTITUTION SYSTEM AND RELATED METHODS

TECHNICAL FIELD

The present invention relates to the field of product substitution, and, more particularly, to product substitution based upon natural language processing and related methods.

BACKGROUND

A substitute product may be considered a product that can be used in place of another product, for example, when a shopper-selected product is not available to purchase. A substitute product may also be considered a complementary product in that a given product may often be used or purchased together with another product such that the products together are complementary or substitutable for each other.

Natural language processing (NLP) may be considered a form of artificial intelligence. NLP operates based upon interactions between computers and human language, in particular, programming of computers to process and analyze large amounts of natural language data. Using NLP, a computer may learn or conceptually understand contents of text including contextual nuances of the language within the contents. Information from the natural language may be extracted and form a basis for machine learning.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A product substitution system may include a shopper device associated with a given shopper, and a product substitution server. The product substitution server may be configured to obtain descriptive purchased product data for a plurality of purchased products from at least one retailer, and iteratively operate a natural language processing (NLP) algorithm to accept, as input thereto, the descriptive purchased product data, and generate, as output therefrom, a multi-dimensional representation of a relationship among the purchased products. The product substitution server may also be configured to, for each iteration, determine a product-to-product affinity based upon the multi-dimensional representation of the relationship, and determine at least one recommended substitute product for one of the plurality of purchased products based upon the determined product-to-product affinity, and communicate the at least one recommended substitute product to the shopper device. The product substitution server may be configured to, for each iteration, obtain updated descriptive purchased product data for an updated plurality of purchased products from the at least one retailer.

The product substitution server may be configured to generate and communicate a digital promotion for the at least one recommended substitute product, for example. The product substitution server may also be configured to operate the NLP algorithm to generate the multi-dimensional representation by, for each product of the plurality of purchased products, generating coordinates in multi-dimensional space and mapping the coordinates in the multi-dimensional space. The product substitution server may be configured to determine the product-to-product affinity by determining nearest neighbors in the multi-dimensional representation of the relationship, and determining a distance between the nearest neighbors that is representative of the product-to-product affinity.

The product substitution server may be configured to, for a given product, rank the nearest neighbors based upon the determined distances, and apply, as input, the ranked nearest neighbors to a classifier to determine the at least one recommended substitute product for one of the plurality of purchased products, for example. The product substitution server may be configured to operate the classifier to determine whether the products represented by the ranked nearest neighbors are in a same group, and when so determine the at least one recommended substitute product based upon the products being in the same group, for example.

The multi-dimensional representation may include a 128-dimension representation. The NLP algorithm may include a Word2Vec algorithm, for example.

A method aspect is directed to a method of processing a product substitution. The method may include using a product substitution server to obtain descriptive purchased product data for a plurality of purchased products from at least one retailer for a given shopper, and iteratively operate a natural language processing (NLP) algorithm to accept, as input thereto, the descriptive purchased product data, and generate, as output therefrom, a multi-dimensional representation of a relationship among the purchased products. The method may further include using the product substitution server to, for each iteration, determine a product-to-product affinity based upon the multi-dimensional representation of the relationship, and determine at least one recommended substitute product for one of the plurality of purchased products based upon the determined product-to-product affinity, and communicate the at least one recommended substitute product to a shopper device associated with the given shopper. The method may also include using the product substitution server to, for each iteration, obtain updated descriptive purchased product data for an updated plurality of purchased products from the at least one retailer.

A computer readable medium aspect is directed to a non-transitory computer readable medium for processing a product substitution. The non-transitory computer readable medium may include computer executable instructions that when executed by a processor of a product substitution server cause the processor to perform operations. The operations may include obtaining descriptive purchased product data for a plurality of purchased products from at least one retailer for a given shopper, and iteratively operating a natural language processing (NLP) algorithm to accept, as input thereto, the descriptive purchased product data, and generate, as output therefrom, a multi-dimensional representation of a relationship among the purchased products. The operations may also include, for each iteration, determining a product-to-product affinity based upon the multi-dimensional representation of the relationship, and determining at least one recommended substitute product for one of the plurality of purchased products based upon the determined product-to-product affinity and communicating the at least one recommended substitute product to a shopper device associated with the given shopper. The operations may further include, for each iteration, obtaining updated descriptive purchased product data for an updated plurality of purchased products from the at least one retailer.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
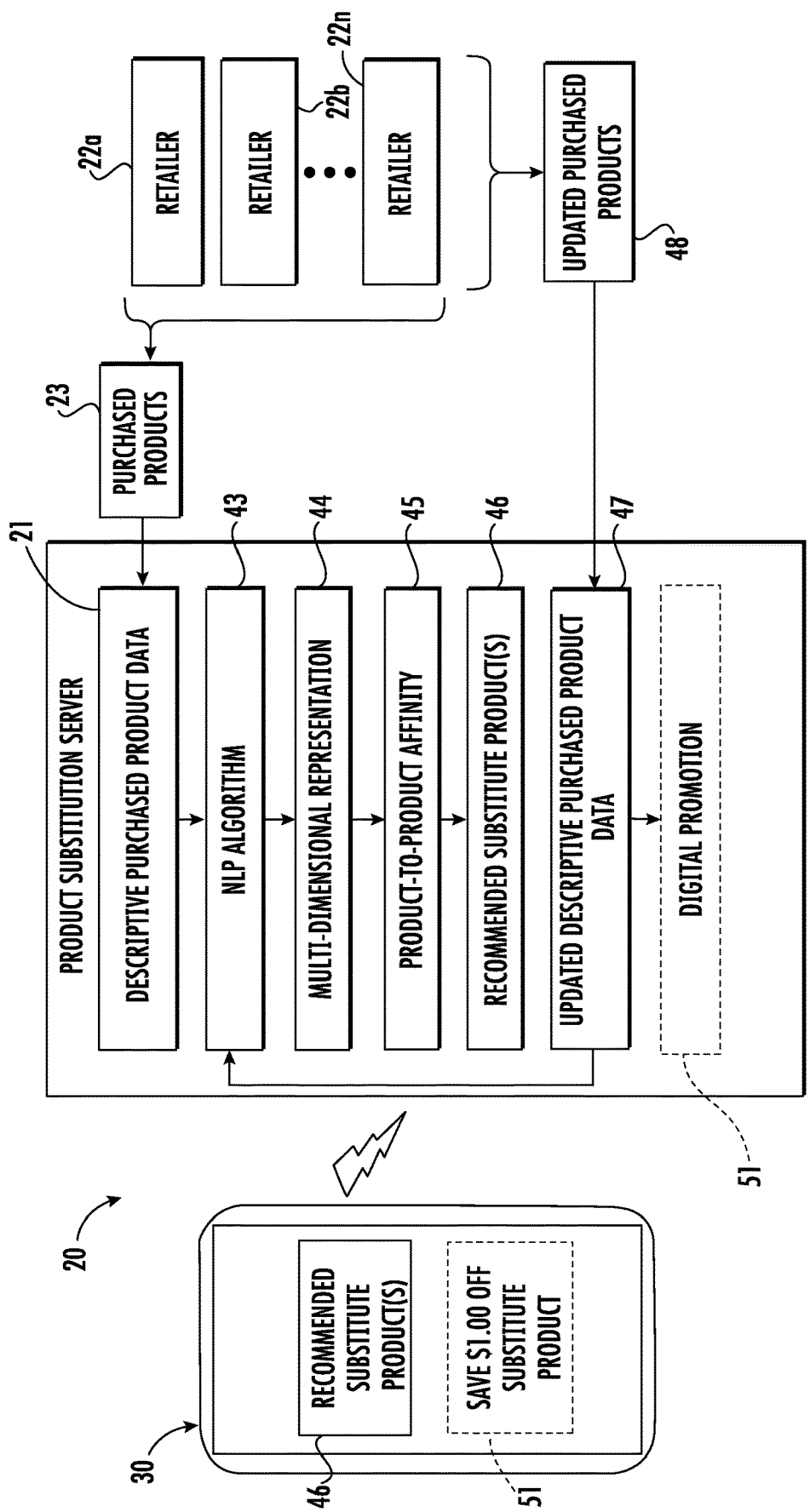
FIG. 1 is a schematic diagram of a product substitution system in accordance with an embodiment.
Figure 2:
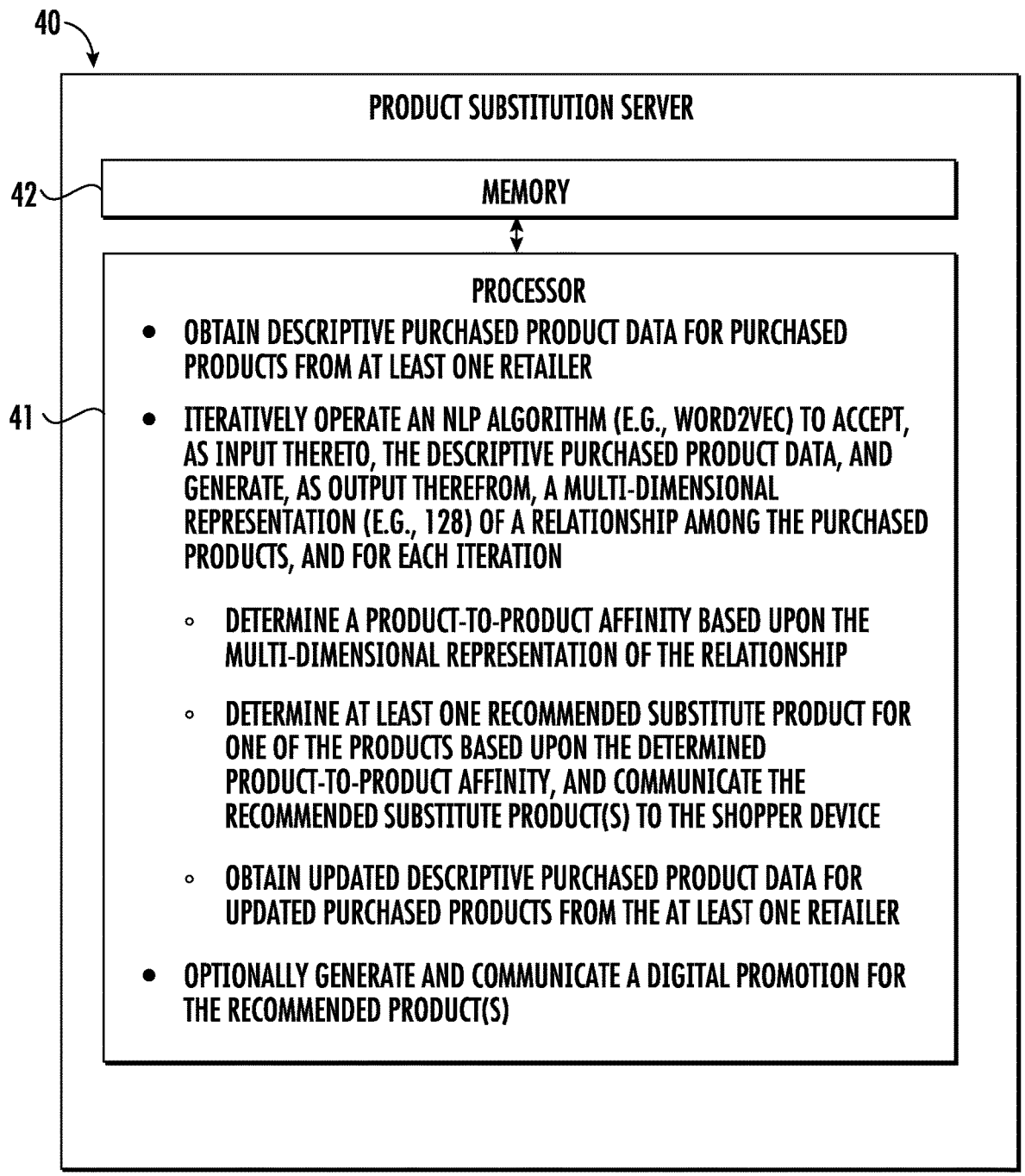
FIG. 2 is a schematic block diagram of the product substitution server of FIG. 1.
Figure 3:
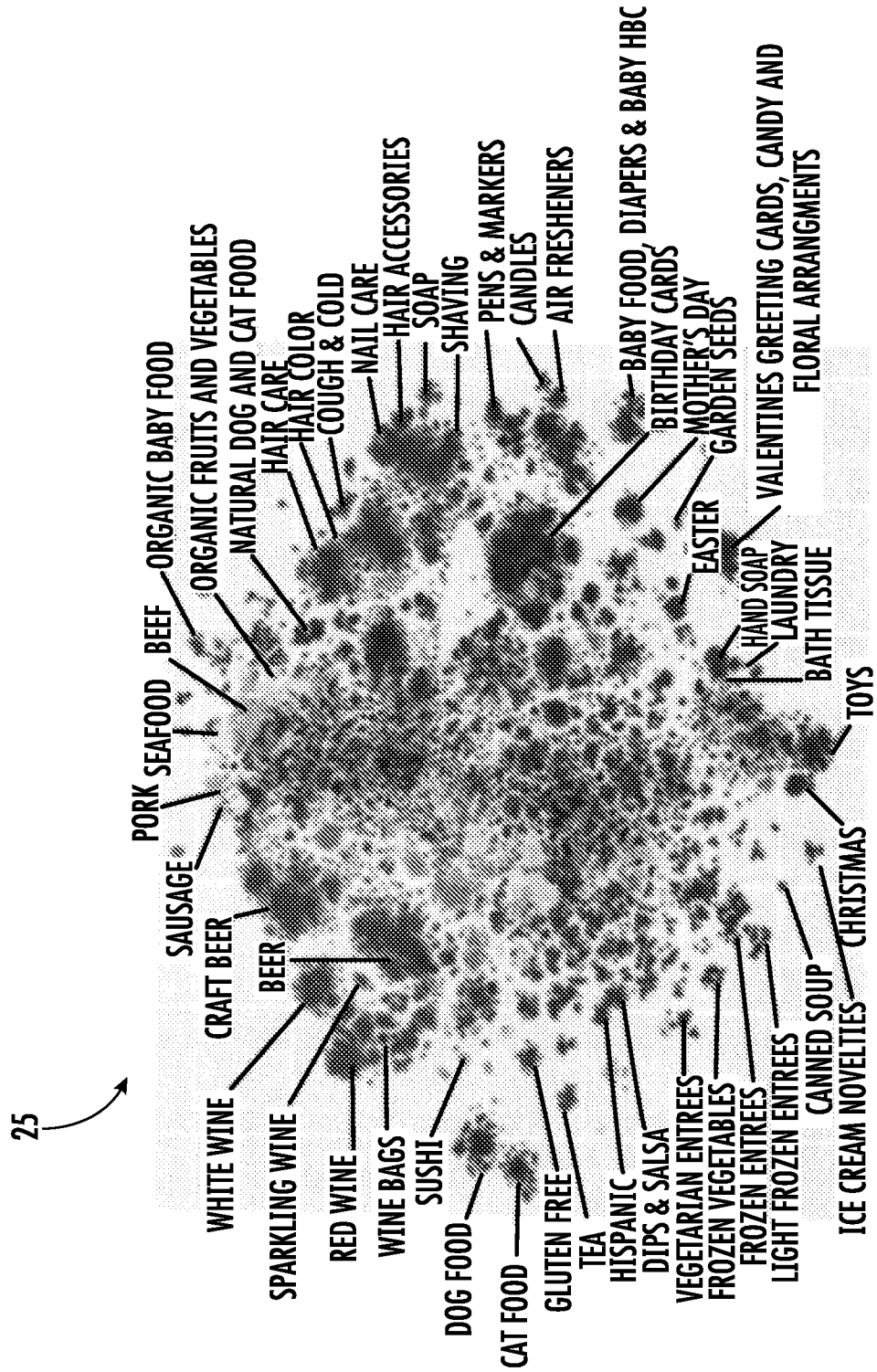
FIG. 3 is a graphical diagram of an exemplary multi-dimensional representation of purchased products for a given retailer generated using the system of FIG. 1.

Referring initially to FIGS. 1-3, a product substitution system 20 includes a shopper device 30 associated with a given shopper. The shopper device 30 is illustratively in the form of a mobile wireless communications device, and more particularly, a mobile phone or smartphone. The shopper device may be another type of device, for example, a laptop computer, a personal computer, a tablet computer, or a wearable computer.

The product substitution system 20 also includes a product substitution server 40. The product substitution server includes a processor 41 and an associated memory 42. While operations of the product substitution server 40 are described herein, the operations are performed based upon cooperation between the processor 41 and the memory 42.

Figure 4:
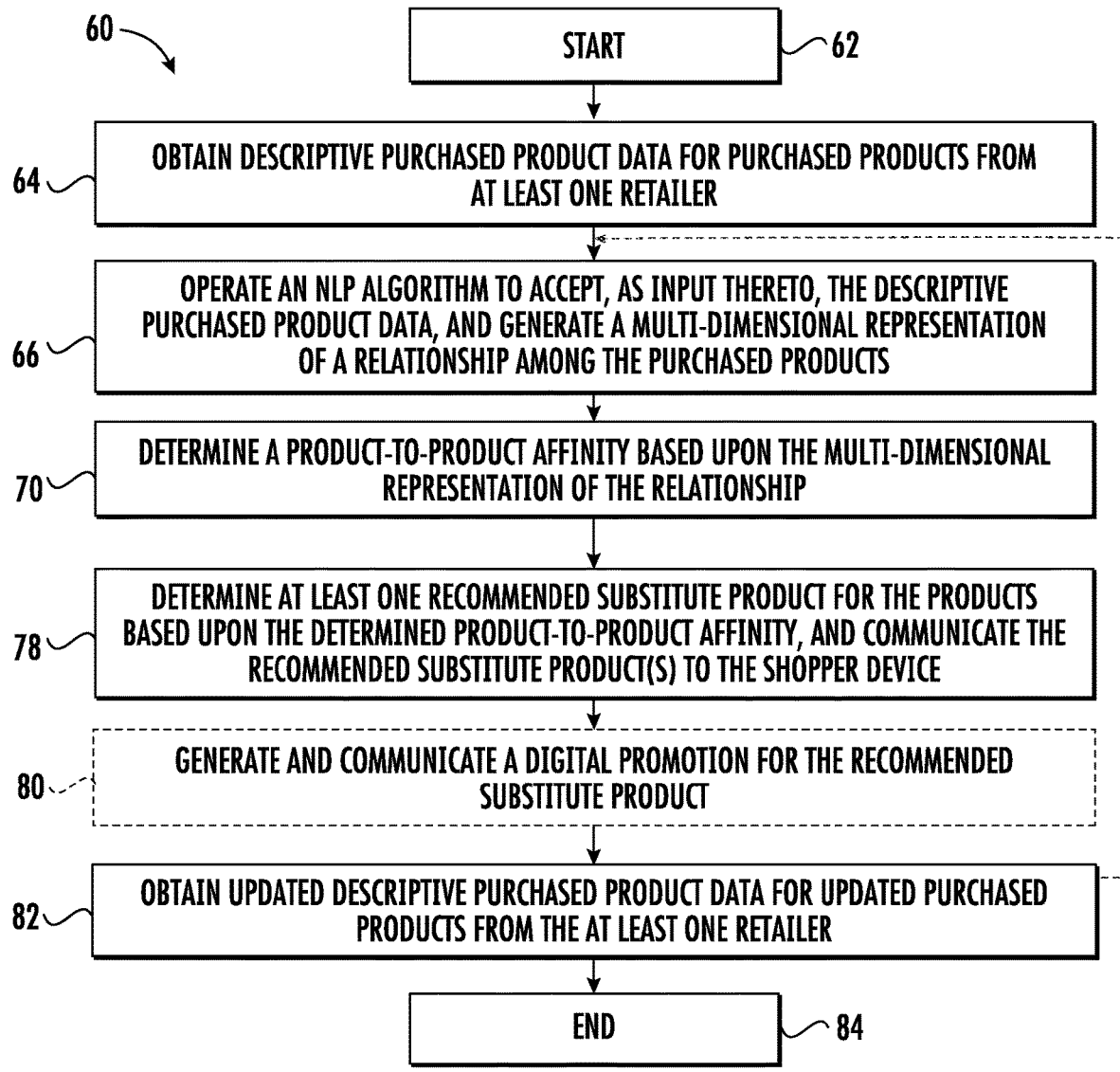
FIG. 4 is a flow diagram illustrating operation of the product substitution server of FIG. 1.

Referring now to the flowchart 60 in FIG. 4, beginning at Block 62, operations of the product substitution server 40 will now be described with respect to a given iteration. At Block 64, the product substitution server 40 obtains descriptive purchased product data 21 for purchased products 23 from one or more retailers 22a-22n. The descriptive purchased product data 21 may be for more than one shopper across the retailers 22a-22n and include descriptive purchased product data for the given shopper. The descriptive purchased product data 21 may include representations, for example, textual representations, of purchased products by shoppers, for example, basket level data. The descriptive purchased product data 21 may include product identifiers (e.g., uniform product code (UPC) or stock keeping unit (SKU)), quantity of a given product, date, price paid, and/or whether a coupon was applied and the redeemable value of the coupon. The descriptive purchased product data 21 may include other and/or additional data about or associated with purchased products shoppers. The descriptive purchased product data 21 may be for products that have been previously purchased (i.e., historical) and/or for products currently being purchased (e.g., scanned at a physical POS terminal or in a virtual shopping cart on an e-commerce platform). Other information associated with the shoppers may also be obtained, for example, shopper identifier (e.g., loyalty account number, phone number, email address, name, etc.).

The product substitution server 40 iteratively operates a natural language processing (NLP) algorithm 43 (Block 66). More particularly, the NLP algorithm 43 may be operated on an on-going basis, for example, daily, monthly, hourly, for each purchase as descriptive purchased product data 21 is obtained, and/or based upon a request to purchase an out-of-stock item that has been previously purchased, or inability fulfill a now out-of-stock item that was indicated as in-stock at the time or purchase. The NLP algorithm 43 may include a Word2Vec algorithm, for example. The NLP algorithm 43 may include other and/or additional NLP algorithms.

The NLP algorithm 43 accepts, as input thereto, the descriptive purchased product data 21 (Block 66). The NLP algorithm 43 generates, as output therefrom, a multi-dimensional representation 44 of a relationship among the purchased products (Block 66). The multi-dimensional representation 44 may be a 128-dimension representation, for example, as this may provide a better and more accurate representation, as will be appreciated by those skilled in the art. Referring briefly to FIG. 3, an exemplary multi-dimensional representation 25 of grocery products for a given retailer is illustrated.

A more accurate representation may correspond to a more accurate product recommendation, as will be described in further detail below. New input, or updated descriptive purchased product data 47, may be input to the NLP algorithm 43, at each iteration, and thus, a new or updated multi-dimensional representation may be generated with each iteration. The NLP algorithm 43 may be operated to generate the multi-dimensional representation 44 by, for each product 23, generating coordinates in multi-dimensional space, and mapping the coordinates in the multi-dimensional space.

For each iteration of the NPL algorithm 43, the product substitution server 40 determines a product-to-product affinity 45 based upon the multi-dimensional representation 44 of the relationship (Block 70). The relationship between and/or among elements representative of the products for purchase 23, as graphically represented, may be indicative of a potential relationship between elements. Indeed, the coordinates, as mapped, may determine the relative position of represented product for purchase 23 and thus, any affinity between the products may be determined, for example, by where they are mapped relative to one another in the multi-dimensional representation 44.

At Block 78, for a given iteration, the product substitution server 40 determines one or more recommended substitute products 46 for one of purchased products 23 based upon the determined product-to-product affinity 45 and communicates the recommended substitute products to the shopper device 30 (e.g. for display thereon, and/or for the given shopper). As will be appreciated by those skilled in the art, and described in further detail below, the product-to-product affinity 45 may be indicative or used to infer which products 23 may be interchangeable in terms of substitution or may be considered complementary (e.g., often used or purchased together). In some embodiments, the product substitution server 40 may store the one or more recommended substitute products 46 for communication to the shopper device 30 upon a given event (e.g., purchase of one an item that is out-of-stock or unable to be fulfilled, purchase of a product considered to complementary or substitutable with the recommended substitute product).

In a given exemplary implementation, the determined recommended substitute product 46 may be mustard based upon an affinity to ketchup. Thus, if ketchup is not available, the recommended substitute product 46 may be mustard. Alternatively or additionally in another exemplary implementation, the determined recommended substitute product may be a "Brand-M Mustard" based upon an affinity to other "Brand-M" products, such that if a "Brand-B Mustard" is not available, the recommended substitute product may be the "Brand-M Mustard."

The product substitution server 40 may generate and communicate a digital promotion 51 for the recommended substitute product 46, for example, for display on the shopper device 30 (Block 80). The digital promotion 51 is illustratively in the form of a digital coupon and has a redeemable value toward purchase of the recommended substitute product 46, for example, at a given retailer or any of the retailers 22a-22n. The digital promotion 51 may be saved to a digital wallet associated with the given shopper based upon cooperation between the product substitution server 40 and the shopper device 30.

At Block 82, the product substitution server 40 obtains updated descriptive purchased product data 47 for updated purchased products 48 from the one or more retailers 22a-22n for shoppers, for example, and including the given shopper. The updated descriptive purchased product data 47 may be obtained similarly to the descriptive purchased product data 21, as described above. While operations for a given iteration of the NLP algorithm 43 end at Block 84, a next iteration of the NLP algorithm is operated (Block 66). It should be noted that a digital promotion 51 may not be generated for each recommended substitute product 46, and the iterations generally continue until terminated, for example, by way of input to the product substitution server 40. However, without termination from an external factor, the process may continue infinitely.

Figure 5:
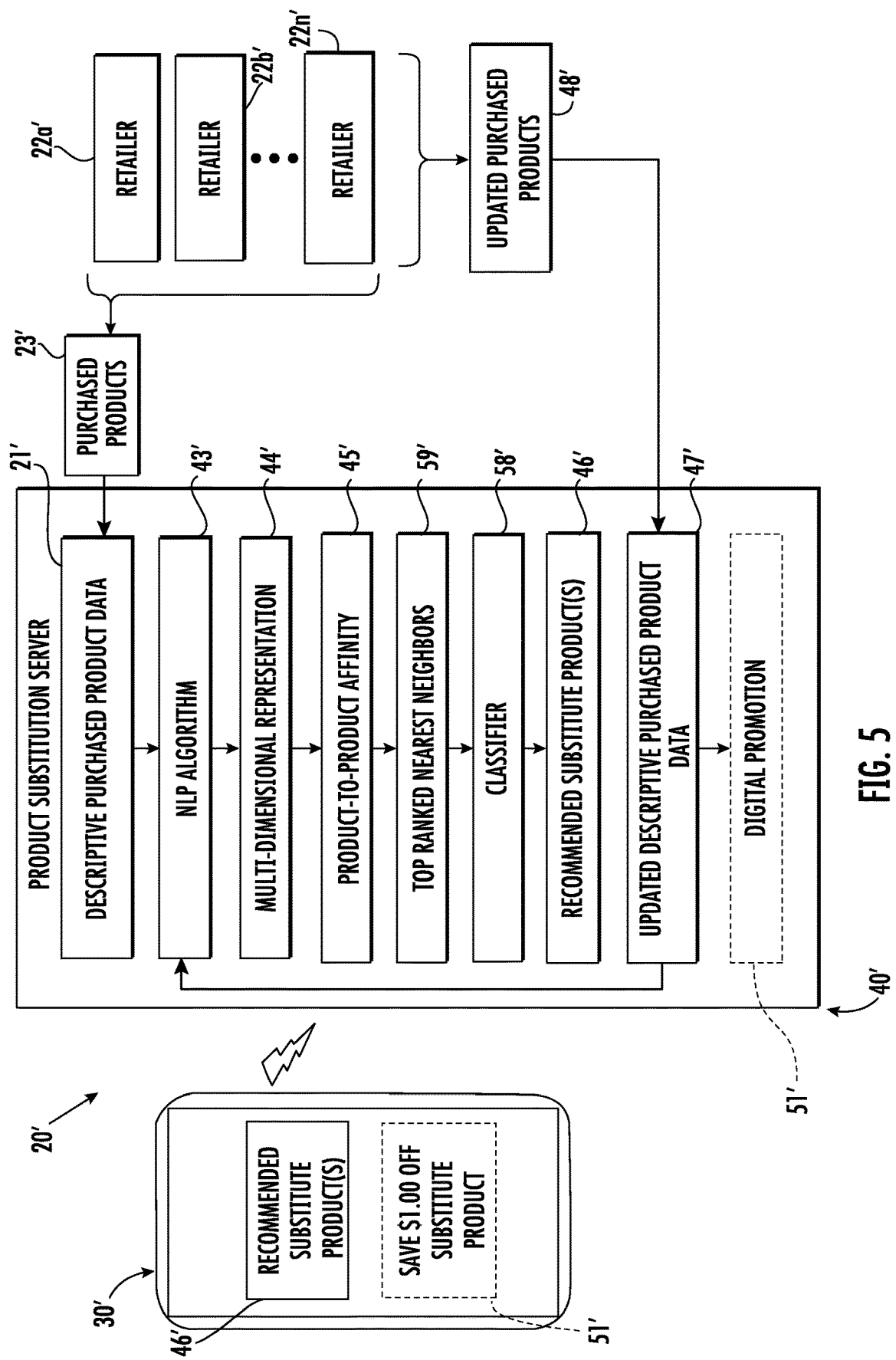
FIG. 5 is a schematic diagram of a product substitution system in accordance with another embodiment.
Figure 6:
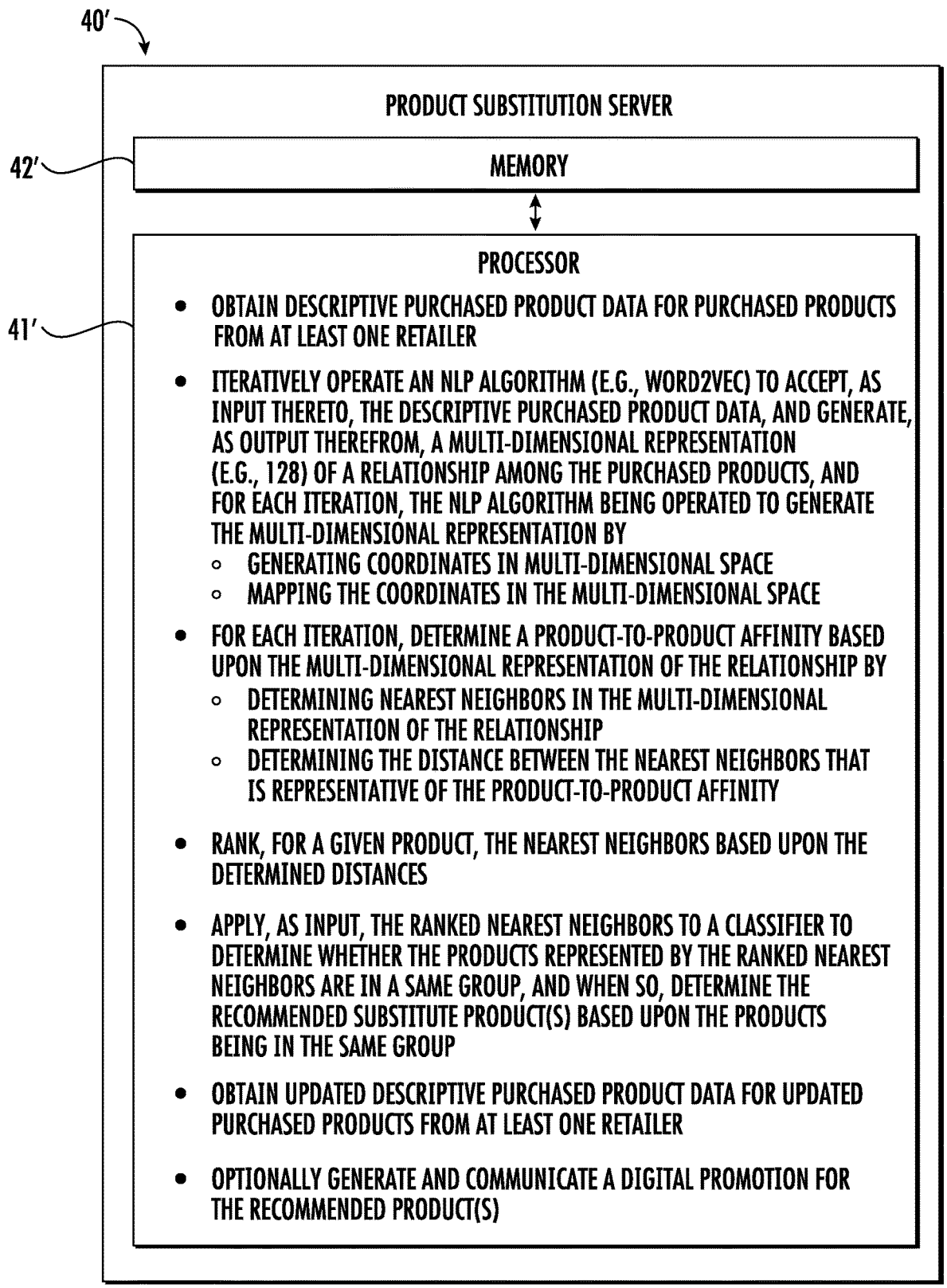
FIG. 6 is a schematic block diagram of the product substitution server of FIG. 5.
Figure 7:
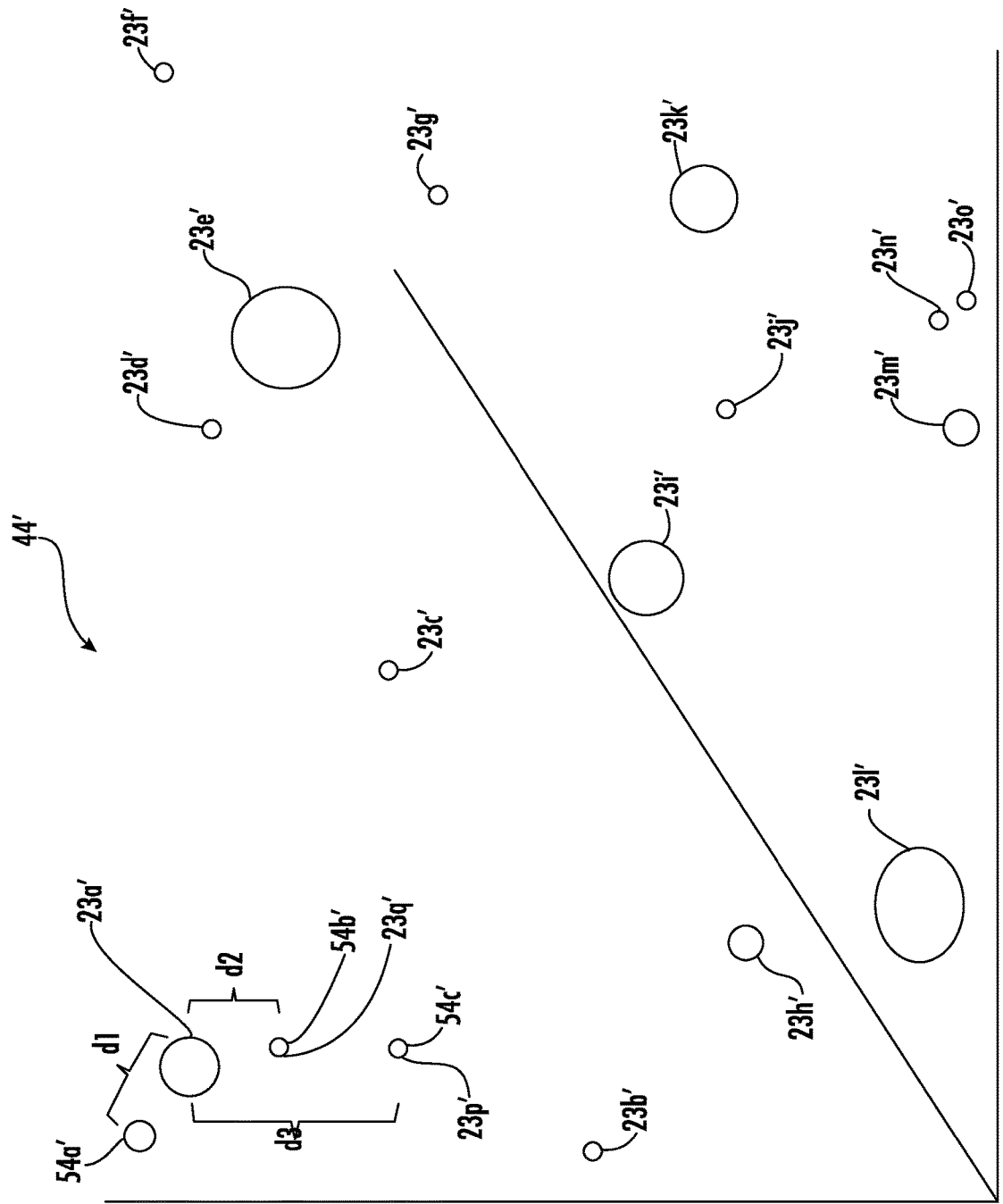
FIG. 7 is a schematic graphical diagram of an exemplary multi-dimensional representation of purchased products for a given retailer generated using the system of FIG. 5.
Figure 8:
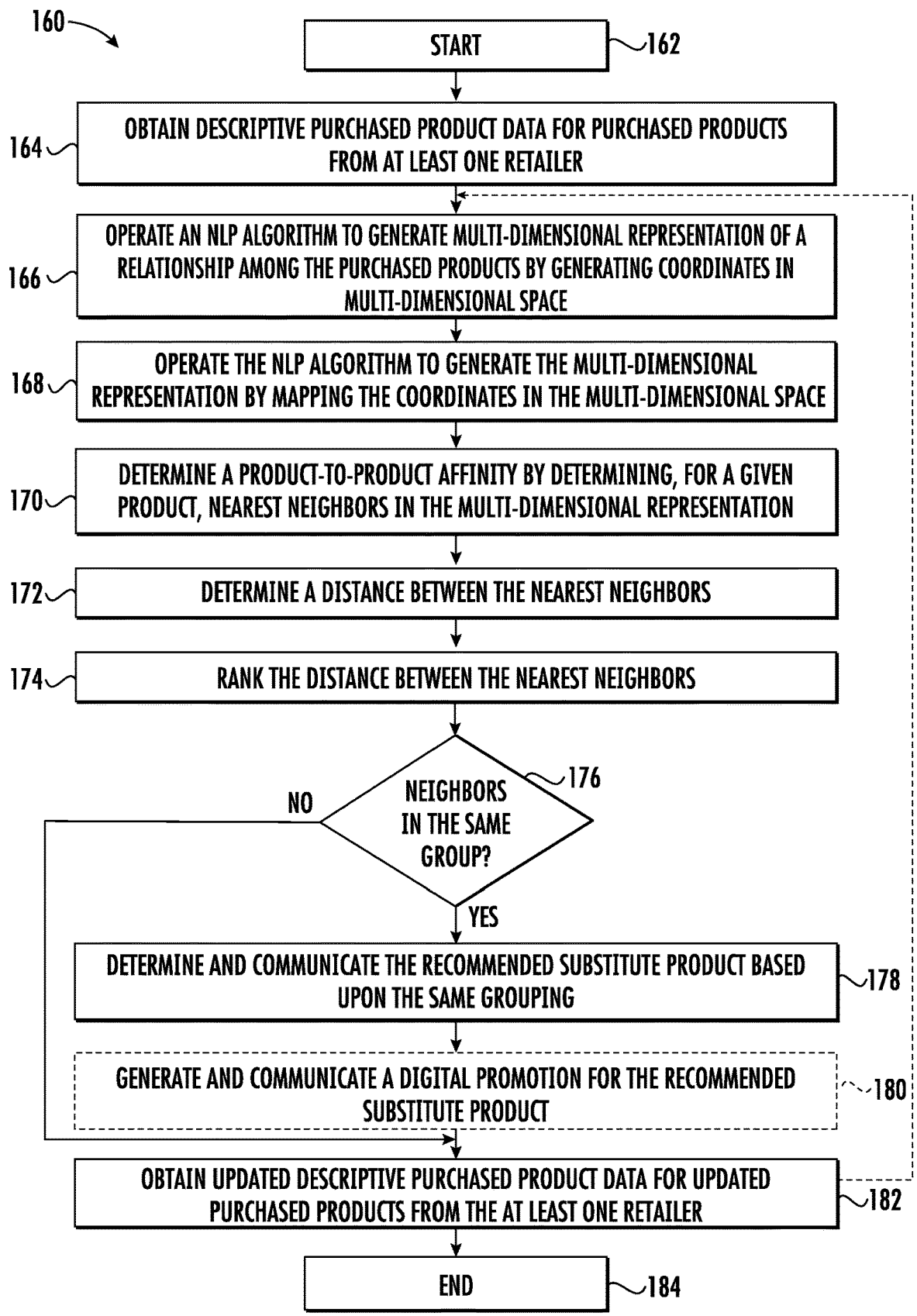
FIG. 8 is a flow diagram illustrating operation of the product substitution server of FIG. 5.

Referring now to FIGS. 5-7, and the flowchart 160 in FIG. 8, beginning at Block 162, more detailed operations of the product substitution server 40' via cooperation between the processor 41' and the memory 42' and as it relates to a given iteration will now be described. At Block 164, the product substitution server 40' obtains descriptive purchased product data 21' for purchased products 23' from one or more retailers 22a'-22n' similarly to the embodiments described above. The product substitution server 40', also similarly to the embodiments described above, iteratively operates a natural language processing (NLP) algorithm 43' to generate a multi-dimensional representation 44' by, for each product 23', generating coordinates in multi-dimensional space (Block 166), and mapping the coordinates in the multi-dimensional space (Block 168).

For each iteration of the NPL algorithm 43', the product substitution server 40' determines a product-to-product affinity 45' by determining, for a given product 23a' from among the products 23a'-23q', nearest neighbors 54a' 54b', 54c' in the multi-dimensional representation 44' (Block 170) (FIG. 7). It should be understood that the multi-dimensional representation 44' illustrated in FIG. 7 is in 3-dimensions for ease of illustration. A distance $d_1$-$d_3$ between the nearest neighbors 54a' 54b', 54c' is determined (Block 172). The distances $d_1$-$d_3$ between nearest neighbors are ranked, for example, from shortest to longest, the smaller distances of which may be representative of higher or stronger affinity between those products 23a'-23q' (Block 174) (FIG. 7).

The ranked nearest neighbors 59', for example, the top ranked nearest neighbors, are input to a classifier 58'. As will be appreciated by those skilled in the art, the classifier 58' is used in conjunction with the NLP algorithm 43' to perform machine learning or artificial intelligence (AI) operations. At Block 176, the classifier 58' is operated to determine whether the products represented by the ranked nearest neighbors are in a same group, for example, product category, and when so (at Block 176), the substitute recommended product(s) 46' are determined based upon their being in a same group (Block 178). If, at Block 176, the classifier 58' determines the products represented by the nearest neighbors are not in the same group, updated descriptive purchased product data 47' is obtained for updated purchased products 48', as described in the above embodiments (Block 182).

Upon determining and communicating the substitute recommended product 46', the product substitution server 40' may generate and communicate a digital promotion 51' similarly to the embodiments described above (Block 180). At Block 182, the product substitution server 40' obtains updated descriptive purchased product data 47' for updated purchased products 48', as described in the above embodiments. While operations for a given iteration of the NLP algorithm 43' end at Block 184, a next iteration of the NLP algorithm is operated (Block 166). It should be noted that a digital promotion 51' may not be generated for each recommended substitute product 46', and the iterations generally continue until terminated, for example, by way of input to the product substitution server 40'. However, without termination from an external factor, the process may continue infinitely.

As will be appreciated by those skilled in the art, the present product substitution system 20 conceptually processes transactional basket data as the ground truth, specifically product co-occurrence, and builds the product space by embedding products in a high dimensional manifold in such a way that "nearby" products are similar. The completeness and accuracy of the data may be based upon the transaction log data, which may avoid any inherent issues that may occur from item master or brand-specific datasets, for example. The product substitution system 20 may advantageously generate both product latent factors and product nearest neighbors products which are the foundation of an intelligent product space ecosystem.

For example, in an exemplary implementation of the claimed system 20, as it relates to the machine learning functions, training may occur when the current basket data or file size plus a relatively large, for example, largest, increase in file size on a monthly upload exceeds 60 GB, for example. Thus, the file system should also be large as it must store not only the models but the basket training file.

The operations may be considered operations within an infinite loop that itself loops over retailers. For example, to determine which retailers should have latent factors generated or updated, a client file may be obtained at the start of each outer loop, and can be updated at any time. To update latent factors, operations may include loading an existing latent factor model for the retailer, determining how many months of data are necessary to update the model, then sequentially obtaining transaction log data for each month. When all months have been gathered, or the system is deemed to have a sufficient, for example, maximum, amount of data allowed prior to training, based upon a maximum expected file size, the model vocabulary (product list), is updated followed by updating of the model. Data is continued to be obtained until all months have been gathered and updates performed, for example. Once the model is up to date, the model and a pickle file of the latent factors to be used in other products are saved. In the case that a retailer does not have an existing model, an empty model may be instantiated, and the model trained with data from the last 12 months using the same method as in updates. After training is complete, the pickled product latent factors may become available for use by other processes.

In addition to computing the product latent factors, a comma delimited file may be generated with, for example, the 500 nearest neighbors to each product, the distance between the products, and the intelligent product space gravity. The nearest neighbors and distances are computed using a ball tree implementation, for example. The product nearest neighbor distances may be stored and made available to other services for access.

With respect to the NLP algorithm 43 of the present system 20, particularly, the Word2Vec algorithm, the Word2Vec algorithm may typically be recognized as a relatively efficient neural approach to learn high quality vector representations of words from large amounts of unstructured text data. Neural approaches for learning word vectors were considered as they tend to encode linguistic relationships between the words themselves, which is gathered from the sentences that contain the words. Indeed, the same architecture and training scheme may be applied in a retail environment, for example, to the relatively large amounts of unstructured log data.

Accordingly, the present system 20, in some embodiments, may apply variations of the Word2Vec algorithm. Several implementations of the Word2Vec algorithm were considered, including implementations in Spark and Python packages. However, a preferred implementation may be the Gensim package, for example, based upon the ability to update the model with new baskets instead of training a new model from scratch. Those skilled in the art will appreciate that updating existing model weights frequently improves over-all model performance across a variety of neural architectures, including word embeddings. Thus, at the desired interval, for example, the model is updated using the baskets from the previous interval, which may advantageously permit learning from new data without training a completely new model each month. Another consideration with respect to the architecture behind the present system 20 is scalability.

Initial hyperparameter sets for the present system 20 were determined based upon relative simplicity of implementation and results of previous work in the recommendation community about optimal Word2Vec hyperparameters. However, the operations of the present system 20, particularly determining a recommended substitute product, are generally not sequential in nature, in contrast to certain types of recommendations, for example, a next song or movie based upon previously viewed songs or movies. The hyperparameter sets were assessed using ranking metrics on the ordering of the offers that would have been made had the system been in use compared with selections by consumers at various points in development to settle on an acceptable hyperparameter set.

The system 20 may also be particularly advantageous for creating targeted custom segments for example, for promotion. In other words, the system 20 may provide additional insights into what the product space was learning so as to explain the results of the targeting. To perform the above-noted additional insights, high level visualizations were used (e.g., t-SNE). By plotting the visualization, for example, with color representing each subcategory, it may be determined that the system tends to co-locate items that share a subcategory, it may be deduced that the product space is capturing much of the categorization performed in retailer and trade hierarchies.

The visualization also permits observation of where the product space identifies relationships between products across categories. An example visualization is illustrated in FIG. 3. For example, wine bags from the gift wrap and party subcategory are located within the part of the product space that includes wine. Exemplary data from multiple retailers illustrated that clusters within the product space that are identified by a relatively important attribute to the shoppers at that retailer. For example, at one given retailer a relatively large Kosher cluster was determined. Frequently, a natural or organic cluster includes sub-cluster patterns similar to the cluster patterns in the rest of the product space.

While the visualizations alone may be relatively interesting with respect to data analytics, the visualizations typically do not permit direct querying, and thus, the present system 20 includes the product nearest neighbors output to permit granular insights into the products purchased by consumers, for example, targeted consumers. One consideration with respect to computational feasibility when building the distances may be that only nearby products are of interest. Thus, a relatively large computational burden of building out the full distance matrix by only computing distances for products that are nearest neighbors of each other may be reduced. In an embodiment, an implementation of the Ball Tree algorithm may be used as it may be considered a relatively efficient algorithm in higher dimensions, for example, 128. In an implementation, the number of nearest neighbors may be set to 500, for example, as it provides sufficient neighbors for most applications while avoiding what may be considered unnecessary computation. Ultimately, as it relates to the present system 20, these distances may be used not only to provide insight into the product space, but can be used to provide recommendation and targeting capabilities at significant computational savings.

A method aspect is directed to a method of processing a product substitution. The method includes using a product substitution server 40 to obtain descriptive purchased product data 21 for a plurality of purchased products 23 from at least one retailer 22a-22n, and iteratively operate a natural language processing (NLP) algorithm 43 to accept, as input thereto, the descriptive purchased product data, and generate, as output therefrom, a multi-dimensional representation 44 of a relationship among the purchased products. The method further includes using the product substitution server 40 to, for each iteration, determine a product-to-product affinity 45 based upon the multi-dimensional representation 44 of the relationship, and determine at least one recommended substitute product 46 for one of the plurality of purchased products 23 based upon the determined product-to-product affinity, and communicate the at least one recommended substitute product to a shopper device 30 associated with the given shopper. The method also includes using the product substitution server 40 to, for each iteration, obtain updated descriptive purchased product data 47 for an updated plurality of purchased products 48 from the at least one retailer 22a-22n.

A computer readable medium aspect is directed to a non-transitory computer readable medium for processing a product substitution. The non-transitory computer readable medium includes computer executable instructions that when executed by a processor 41 of a product substitution server 40 cause the processor to perform operations. The operations include obtaining descriptive purchased product data 21 for a plurality of purchased products 23 from at least one retailer 22a-22n, and iteratively operating a natural language processing (NLP) algorithm 43 to accept, as input thereto, the descriptive purchased product data, and generate, as output therefrom, a multi-dimensional representation 44 of a relationship among the purchased products. The operations also include, for each iteration, determining a product-to-product affinity 45 based upon the multi-dimensional representation 44 of the relationship, and determining at least one recommended substitute product 46 for one of the plurality of purchased products 23 based upon the determined product-to-product affinity and communicating the at least one recommended substitute product to a shopper device 30 associated with the given shopper. The operations further include, for each iteration, obtaining updated descriptive purchased product data 47 for an updated plurality of purchased products 48 from the at least one retailer 22a-22n.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product substitution system comprising:
   a shopper device associated with a given shopper; and
   a product substitution server configured to
      obtain descriptive purchased product data for a plurality of purchased products from at least one retailer,
      iteratively operate a natural language processing (NLP) algorithm to accept, as input thereto, the descriptive purchased product data, and generate, as output therefrom, a multi-dimensional representation of a relationship among the purchased products, and for each iteration,
         determine a product-to-product affinity based upon the multi-dimensional representation of the relationship by determining nearest neighbors in the multi-dimensional representation of the relationship and determining a distance between the nearest neighbors that is representative of the product-to-product affinity,
         for a given product, rank the nearest neighbors based upon the determined distances,
         apply, as input, the ranked nearest neighbors to a classifier,
         operate the classifier to determine whether the products represented by the ranked nearest neighbors are in a same group, the classifier cooperating with the NLP algorithm to train a machine learning model to classify the ranked nearest neighbors by group, and when so
            determine at least one recommended substitute product for one of the plurality of purchased products based upon the determined product-to-product affinity, and communicate the at least one recommended substitute product to the shopper device, and when not so,
            obtain updated descriptive purchased product data for an updated plurality of purchased products from the at least one retailer for an operation of the classifier during a next iteration.

2. The product substitution system of claim 1 wherein the product substitution server is configured to generate and communicate a digital promotion for the at least one recommended substitute product.

3. The product substitution system of claim 1 wherein the product substitution server is configured to operate the NLP algorithm to generate the multi-dimensional representation by, for each product of the plurality of purchased products, generating coordinates in multi-dimensional space and mapping the coordinates in the multi-dimensional space.

4. The product substitution system of claim 1 wherein the multi-dimensional representation comprises a 128-dimension representation.

5. The product substitution system of claim 1 wherein the NLP algorithm comprises a Word2Vec algorithm.

6. A product substitution server comprising:
   a processor and an associated memory configured to
      obtain descriptive purchased product data for a plurality of purchased products from at least one retailer,
      iteratively operate a natural language processing (NLP) algorithm to accept, as input thereto, the descriptive purchased product data, and generate, as output therefrom, a multi-dimensional representation of a relationship among the purchased products, and for each iteration,
      determine a product-to-product affinity based upon the multi-dimensional representation of the relationship by determining nearest neighbors in the multi-dimensional representation of the relationship and determining a distance between the nearest neighbors that is representative of the product-to-product affinity,
      for a given product, rank the nearest neighbors based upon the determined distances,
      apply, as input, the ranked nearest neighbors to a classifier,
      operate the classifier to determine whether the products represented by the ranked nearest neighbors are in a same group, the classifier cooperating with the NLP algorithm to train a machine learning model to classify the ranked nearest neighbors by group, and when so,
         determine at least one recommended substitute product for one of the plurality of purchased products based upon the determined product-to-product affinity, and communicate the at least one recommended substitute product to a shopper device associated with the given shopper, and when not so, obtain updated descriptive purchased product data for an updated plurality of purchased products from the at least one retailer for an operation of the classifier during a next iteration.

7. The product substitution server of claim 6 wherein the processor is configured to generate and communicate a digital promotion for the at least one recommended substitute product.

8. The product substitution server of claim 6 wherein the processor is configured to operate the NLP algorithm to generate the multi-dimensional representation by, for each product of the plurality of purchased products, generating coordinates in multi-dimensional space and mapping the coordinates in the multi-dimensional space.

9. A method of processing a product substitution comprising:
using a product substitution server to
obtain descriptive purchased product data for a plurality of purchased products from at least one retailer for a given shopper,
iteratively operate a natural language processing (NLP) algorithm to accept, as input thereto, the descriptive purchased product data, and generate, as output therefrom, a multi-dimensional representation of a relationship among the purchased products, and for each iteration,
determine a product-to-product affinity based upon the multi-dimensional representation of the relationship by determining nearest neighbors in the multi-dimensional representation of the relationship and determining a distance between the nearest neighbors that is representative of the product-to-product affinity,
for a given product, rank the nearest neighbors based upon the determined distances,
apply, as input, the ranked nearest neighbors to a classifier,
operate the classifier to determine whether the products represented by the ranked nearest neighbors are in a same group, the classifier cooperating with the NLP algorithm to train a machine learning model to classify the ranked nearest neighbors by group, and when so,
determine at least one recommended substitute product for one of the plurality of purchased products based upon the determined product-to-product affinity, and communicate the at least one recommended substitute product to a shopper device associated with the given shopper, and when not so,
obtain updated descriptive purchased product data for an updated plurality of purchased products from the at least one retailer for an operation of the classifier during a next iteration.

10. The method of claim 9 wherein using the product substitution server comprises using the product substitution server to generate and communicate a digital promotion for the at least one recommended substitute product.

11. The method of claim 9 wherein using the product substitution server comprises using the product substitution server to operate the NLP algorithm to generate the multi-dimensional representation by, for each product of the plurality of purchased products, generating coordinates in multi-dimensional space and mapping the coordinates in the multi-dimensional space.

12. A non-transitory computer readable medium for processing a product substitution, the non-transitory computer readable medium comprising computer executable instructions that when executed by a processor of a product substitution server cause the processor to perform operations comprising:
obtaining descriptive purchased product data for a plurality of purchased products from at least one retailer for a given shopper,
iteratively operating a natural language processing (NLP) algorithm to accept, as input thereto, the descriptive purchased product data, and generate, as output therefrom, a multi-dimensional representation of a relationship among the purchased products, and for each iteration,
determining a product-to-product affinity based upon the multi-dimensional representation of the relationship by determining nearest neighbors in the multi-dimensional representation of the relationship and determining a distance between the nearest neighbors that is representative of the product-to-product affinity,
for a given product, rank the nearest neighbors based upon the determined distances,
apply, as input, the ranked nearest neighbors to a classifier,
operate the classifier to determine whether the products represented by the ranked nearest neighbors are in a same group, the classifier cooperating with the NLP algorithm to train a machine learning model to classify the ranked nearest neighbors by group, and when so,
determining at least one recommended substitute product for one of the plurality of purchased products based upon the determined product-to-product affinity, and communicating the at least one recommended substitute product to a shopper device associated with the given shopper, and when not so,
obtaining updated descriptive purchased product data for an updated plurality of purchased products from the at least one retailer for an operation of the classifier during a next iteration.

13. The non-transitory computer readable medium of claim 12 wherein the operations comprise generating and communicating a digital promotion for the at least one recommended substitute product.

14. The non-transitory computer readable medium of claim 12 wherein the operations comprise operating the NLP algorithm to generate the multi-dimensional representation by, for each product of the plurality of purchased products, generating coordinates in multi-dimensional space and mapping the coordinates in the multi-dimensional space.

* * * * *